Patented Aug. 19, 1924.

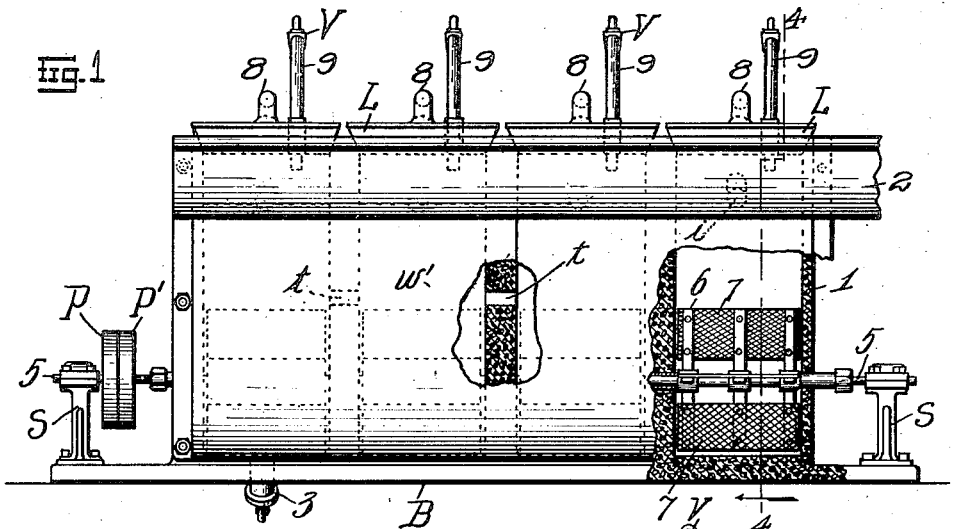
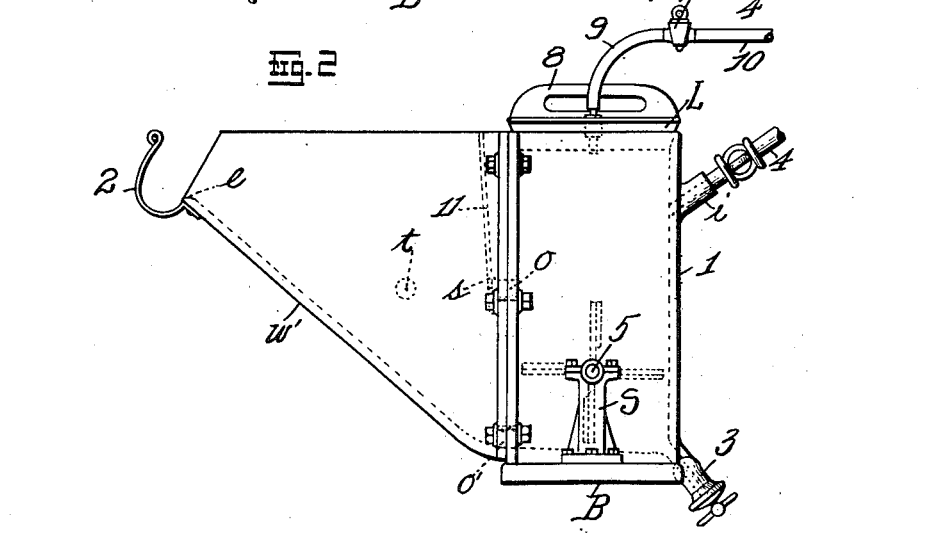
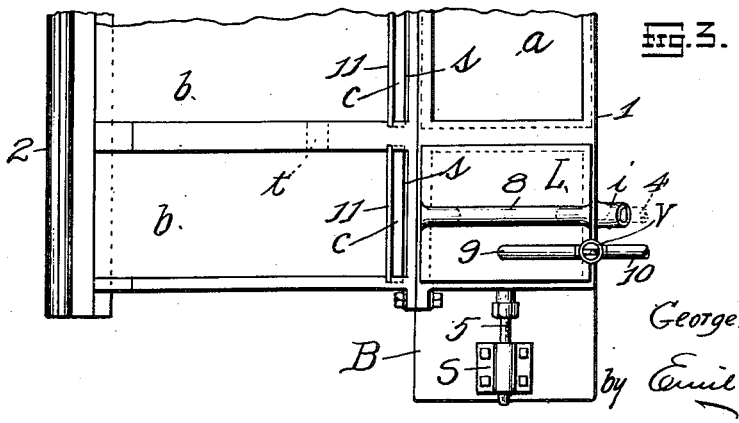

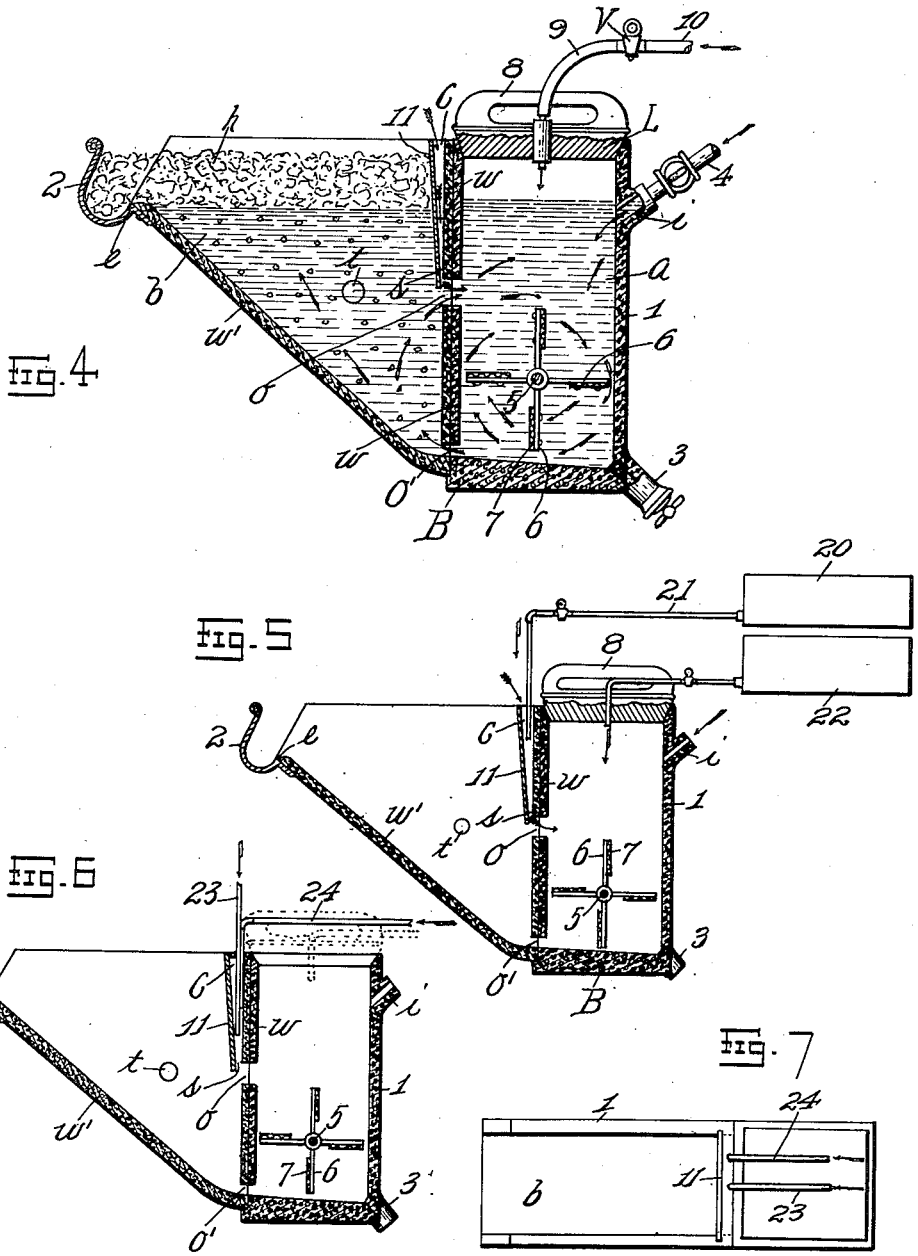

1,505,324

UNITED STATES PATENT OFFICE.

GEORGE B. EBERENZ, OF EL PASO, TEXAS, ASSIGNOR OF ONE-FOURTH TO EDWARD P. MATHEWSON, OF NEW YORK, N. Y., AND THREE-FOURTHS TO THOMAS J. SCANLON, OF ALTON, ILLINOIS.

APPARATUS FOR AND PROCESS OF CONCENTRATING ORES.

Application filed October 22, 1920, Serial No. 418,653. Renewed January 5, 1924.

*To all whom it may concern:*

Be it known that I, GEORGE B. EBERENZ, a citizen of the United States, residing at El Paso, in the county of El Paso and State of Texas, have invented certain new and useful Improvements in Apparatus for and Processes of Concentrating Ores, of which the following is a full, clear, and exact description, reference being had to the accompanying drawings, forming a part hereof.

The present invention is directed to improvements in apparatus for, and process of, concentrating ores by flotation, the object sought being to produce an ideal mineral "gas" froth floatable on the surface of the pulp by subjecting the pulp to the action of sulfureted hydrogen (or equivalent sulfur-carrying reagent) in conjunction with air or other supplemental gaseous reagent operating not only to prevent over-sulfidation of the mineral particles acted on by the sulfureted hydrogen, but to assist in maintaining a proper circulation of the pulp in the cell or treatment vessel wherein the same is (preferably mechanically) agitated and into which the sulfureted hydrogen is conducted above the surface of the pulp to be there absorbed by, and beaten into the pulp for aerating the same. In practicing my invention the usual oil selective agents are dispensed with, the mineral particles being effectively concentrated and brought to the surface in the froth formed by the gases involved in the process. By my process oxidized ores such as carbonates, oxids, silicates and the like generally undergo to some degree superficial sulfidation; and if any natural sulfids are present, these, together with the sulfidized, and any unconverted oxidized particles will be carried into the froth at certain stages of the operation, the frothing being facilitated in the majority of cases by keeping the pulp as nearly neutral as possible by means of caustic alkali, lime or equivalent reagent when the pulp is acid, or by the use of sulfuric or equivalent acid when the pulp is alkaline. If under the latter circumstances carbonates are present, the $CO_2$ gas evolved from the addition of the acid will obviously assist in the aeration of the pulp under treatment. In oil flotation air plays an important part in the formation of the bubbles which result in the final froth. At the same time in what is today recognized as an ideal oil flotation process, dependence is had on the presence of a fraction of one per cent of oil (on the ore) which, as well understood in the art, has a preferential affinity for the mineral particles when in the form of sulfids. This affinity is no doubt due to the reaction between the sulfur of the minerals and the hydrogen of the oil resulting in the formation of sulfureted hydrogen which is recognized as a reducing agent, and as such it no doubt plays an important part in preventing oxidation of the mineral particles by the air with which the pulp is charged and by which they are floated, oxidation of the mineral particles destroying or materially impairing the affinity which the oil manifests therefor when the same are in the form of sulfids. By my process, in lieu of forming the sulfureted hydrogen by the reaction above indicated (between the sulfur of the mineral sulfids and the hydrogen of the oil), I introduce this reagent into the pulp from an outside source, the quantity introduced being controlled by the degree of sulfidation to which it is deemed necessary or desirable to subject the oxidized ore particles to produce the desired froth, the object sought being to effect preferably a superficial sulfidation of the particles, any excess of the reagent being avoided in order not to impart to the sulfidized particles too great a specific gravity or one unfavorable to the production of a coherent mineral froth, it being understood that the sulfids of most of the metals are heavier than the oxids though having a greater affinity for the aerating gases than have the oxids. In my process a certain degree of elasticity may be imparted to the froth by the addition to the pulp of a small quantity (a pinch) of rosin in powdered form, the presence of the rosin likewise assisting in the frothing operation. While it may be possible to devise various forms of apparatus to carry on my process, the apparatus shown in the drawings is eminently adapted for the purpose. The details of the invention will therefore be described in connection with the accompanying drawings in which—

Figure 1 represents a front elevation of a battery of cells with parts broken away, showing one form of my invention; Fig. 2 is an end view of the same; Fig. 3 is a top plan showing one of the end cells and a portion of a cell adjacent thereto, the lid being removed from the latter cell; Fig. 4 is a vertical transverse section on the line 4—4 of Fig. 1; Fig. 5 is a sectional view on the order of Fig. 4 showing a modification of my invention; Fig. 6 is a similar sectional view showing a second modification; and Fig. 7 is a top plan of Fig. 6.

Referring to the drawings, and for the present to Figs. 1 to 4 inclusive, 1 represents a suitable (preferably concrete) tank or cell provided with a stirring compartment a and a froth or concentrate compartment or spitz b, the two compartments being separated by a partition wall w provided with a slot or circulating opening o near the center thereof and extending the width of the cell, a similar but somewhat narrower circulating opening o' being formed between the lower edge of the partition wall and the bottom of the cell. The inclined wall w' of the spitz terminates at the top in a transverse overflow edge e depressed below the side walls of the cell, the froth h flowing over said edge into a launder 2 from which the froth is conducted to any suitable point for further treatment. In the present embodiment of the invention I show a plurality of cells arranged side by side and preferably as a concrete structure of two sections bolted together at the ends and supported on a suitable base B. The several cells communicate with one another through openings t formed in the walls between the successive concentrate compartments b, one of the end cells being provided with a bottom tailings discharge 3 leading from the rear wall of the stirring compartment a, the cell at the opposite end being provided with a pulp-feed pipe 4 discharging through a hollow boss i in the rear wall of its stirring compartment a suitable distance above the bottom of the cell. Disposed across the series of cells, and traversing the compartments a thereof at a point substantially midway between the circulating slots o, o', is a stirrer or beater shaft 5, the same being provided inside each compartment with a series of radially disposed arms 6 to which are secured the beaters or blades 7 made preferably of one-quarter inch screening to better agitate the contents of the compartment and at the same time reduce the horsepower required to drive the shaft. The outer edges of the blades are substantially opposite the opening o when they reach the highest point of their upward sweep, and opposite the opening o' when at the lowest point of their downward sweep, this arrangement tending to secure a thorough circulation of the beaten pulp through said openings, it being understood that the beaters revolve toward the opening o' and from the opening o (clockwise in Fig. 4). The top of each cell is provided with a lid or cover L formed preferably with a handle 8 as shown. The aerating medium or sulfureted hydrogen gas is conducted to the top of the compartment a through the l' 1 by means of a flexible hose 9 coupled to the pipe 10 leading from any suitable source of gas supply, the quantity of gas admitted being regulated by a valve V in said pipe 10. The beater shaft 5 is supported on suitable posts or standards S, S, at the ends of the battery of cells, one end of the shaft being provided with fast and loose belt pulleys P, P' adapted to be driven from any suitable source of power (not shown). Any other method of driving the shaft 5 may obviously be resorted to without in any wise affecting the nature or spirit of the invention.

Disposed across each cell in front of the wall w, or on the side facing the spitz b is a partition or diaphragm 11 inclining downward toward the wall w and terminating a short distance below the upper edge of the slot o, said edge being spaced from the diaphragm sufficiently to leave a narrow transverse passage or slit s between said partition and wall w for the free influx of atmospheric air or other gas into the stirring compartment a, said air or gas being drawn into the zone of agitation in the compartment by the inducing action of the pulp current circulating through the slot o from the spitz b into the compartment a. This influx of air assists the rotary stirrer formed by the blades 7 in maintaining the circulation of the pulp between the compartments a and b in the desired direction, said direction as shown by the arrows in Fig. 4, being from the spitz b through the slot o downward through the compartment a and through the slot o' upward into the spitz b, the sulfureted hydrogen gas admitted to the compartment a on top of the pulp being, under the circumstances, not only absorbed by the pulp in said compartment but beaten into it by the stirring action of the blades. The pulp current traversing the slot o operates as an injector, drawing or sucking into the pulp the air from the chamber or conduit c formed between the wall w and the diaphragm 11. In the normal operation of the machine the top of the compartment a is tightly closed by the lid L so there is no influx of air into the compartment past the lid, and no possible escape of the gas admitted through the hose 9 under the lid. In practice, the sulfureted hydrogen conducted to the pulp is preferably so regulated that no more is admitted into the compartment a than will suffice to effect surface sulfidation of the mineral particles, such surface sulfidation being not only sufficient to cause the sulfidized particles to adhere to the bubbles resulting from the aerating process, but avoiding an unnecessary consumption of gas, or such as would be required were an attempt made to sulfidize the particles clear through. When the sulfureted hydrogen is admitted to the compartment *a* in the regulated quantities aforesaid, the rapidity of its absorption by the pulp, and of its incorporation thereinto by the beaters 7 is such, that the gas pressure in the compartment above the pulp usually drops below atmospheric; and were this drop in pressure to become excessive, the same would interfere with the normal direction of the pulp circulation above described, the rise of the liquid in the stirring compartment coupled with a probable inrush of air through the slit *s* into the top of the compartment due to the vacuum thus formed, having the effect of distorting and in some cases actually reversing said circulation. With my invention the proper direction of the pulp circulation is always assured, the air from the conduit *c* which is induced to flow into the pulp in the stirring compartment *a* through the slit *s* serving to preserve the proper direction of the pulp current, and thereby maintaining normal working conditions within the cell.

The air space or conduit *c*, although in free communication with the cell through the slit *s* will contain no pulp, since the air tending to flow through the slit into the stirring compartment *a* under the inducing action of the pulp current circulating through the slot *o* will depress the pulp in the air conduit to the lowest possible level; and when that level drops below the upper edge of the slot *o*, the air will be automatically sucked into the stirring compartment and into the body of the pulp circulating therein. Obviously, the influx of air through the slit *s* into the stirring compartment *a* is not constant in the normal operation of the machine, but is more or less intermittent, depending on the conditions in the cell. For example, when the machine is first started, and before any concentrates or mineral froth appears on the surface of the pulp in the spitz, air will be drawn into the cell through the slit *s* due to the fact that the pulp has not been sufficiently aerated by the sulfureted hydrogen to prevent accessions thereto of the outside air. On the other hand, as soon as the pulp is thoroughly or sufficiently aerated and froth begins to form, and unless the vacuum above the pulp in the stirring compartment becomes too pronounced no material quantities of air will be drawn into the cell. Again, should an excess of alkali (NaHO) be added to the pulp for neutralizing any acidity, this excess will call for an increased consumption of sulfureted hydrogen for neutralizing purposes thereby interfering with its aerating function (the sulfureted hydrogen being an acid and naturally tending to first react with the alkali to bring about neutralization), the deficiency in the aerating medium being supplied by the air drawn into the stirring compartment through the slit *s*. As soon as normal working conditions in the cell are restored however, so that there is no longer any interference with the natural circulation of the pulp between the compartments *a*, and *b*, air will cease to be drawn in through the slit *s*, although the pulp current circulating through the upper slot *o* tends, by its inducing action to suck in the air, and hold the liquid in the conduit *c* to a level slightly above the upper edge of the slot *o*, the liquid being depressed below said edge the moment that conditions in the cell are for any reason disturbed, allowing the air to be drawn into the cell until normal conditions are again restored.

The operation may be briefly described as follows: Pulp being admitted to one of the end cells through the feed pipe 4, the same flows into the remaining cells through the openings *t* in the walls separating the several spitz compartments *b* as obvious from the drawings. The lids L are then deposited air tight over the several stirring compartments *a* and sulfureted hydrogen gas is admitted to each compartment through the hose 9, and the shaft 5 is set into rotation causing the beaters 7 to revolve as indicated by the arrows in Fig. 4, and setting up a circulation of the pulp from the slot *o* to the slot *o'* in the compartment *a*, and from the slot *o'* to the slot *o* in the spitz *b*. At the same time the necessary neutralizing reagent (preferably in liquid form) is added to the pulp through the air conduit *c*, the said reagent flowing through the slit *s* and mixing with the pulp. If the pulp is acid a suitable alkaline reagent is added; if alkaline, a suitable acid reagent is added, the quantity added being sufficient to effect neutralization of the pulp as near as possible. As soon as the proper conditions of neutrality and pneumatic pressure in the cell have been established, the aerating action of the sulfureted hydrogen beaten into the pulp together with any air that may be drawn in through the slit *s*, results in the formation of gas and air bubbles which rise through the liquid pulp in the spitz *b*, in which the portions of the pulp above the slot *o* are comparatively quiescent, the froth *h* being a mineral froth (in contradistinction to an oil froth), floating on the surface of the pulp in the froth compartment *b* and flowing over the edge *e* into the launder 2. The beating or stirring of the pulp in the compartment *a* causes the liquid to circulate between the compartments *a*, *b*, substantially as indicated by the arrows in Fig. 4, and as more pulp is added to the charge more froth is formed and carried away by the launder 2. The tailings from the several cells discharge through the spout 3 of the cell at the opposite end of the series, said tailings coming clean and being consequently discarded. The sulfureted hydrogen should, as previously stated, be so regulated, and delivered to the pulp only in such quantities as to not more than superfically sulfidize oxidized mineral particles, although over-sulfidation will obviously be prevented or arrested by the air periodically drawn into the body of the pulp through the slit or passage $s$ as above described. Thus the air influx not only acts as a preventer or retarder of sulfidation, but serves to maintain or restore the proper circulation of the pulp under which effective beating or incorporation of the gases into the pulp for frothing purposes is possible. The prevailing ores treated are oxidized ores of copper, zinc, and lead, though chlorid of silver may likewise be successfully floated by my process. The bases of any metallic salts that may be held in solution by the pulp waters may likewise be sulfidized (usually in the form of precipitates of the sulfids of the metals) and floated with the main bulk of sulfidized particles derived from the oxidized mineral particles held in suspension in the pulp water. In the majority of cases the mineral froth formed by the sulfureted hydrogen is sufficiently coherent to maintain its integrity, while being floated to and out of the froth launder 2, but should it be desirable to render the froth more elastic, a pinch of powdered rosin may be added to the pulp during the beating or stirring operation. The stirrer blades constantly churn the contents of the cell, and thereby cause different particles of the pulp to present themselves to the superincumbent body of gas in the compartment $a$ until the entire liquid body is impregnated with the gas which upon its release in the compartment $b$ rises to the surface in bubble form taking with it the sulfidized mineral particles and forming therewith a coherent mineral froth. The process is of course applicable to sulfid ores but obviously the amount of sulfureted hydrogen used would be materially reduced as compared with that employed in connection with oxidized ores where a part of the gas is consumed in superficially sulfidizing a greater portion of the mineral particles so the same will attach themselves to the bubbles formed by the gas with which the pulp is charged. Obviously, a reduction of the sulfureted hydrogen in connection with sulfid ores will cause a corresponding increase in the influx of air from the conduit $c$ in response to the correspondingly increased vacuum likely to be present above the pulp in the stirring compartment $a$.

In the apparatus illustrated in the drawings no means are shown for adding the various reagents to the pulp; and for our immediate purpose we may assume that the same are added through the air conduit $c$ by hand. In practice however any suitable mechanical feeding devices may be provided, and since these are within the purview of the skilled mechanic an illustration thereof is here unnecessary.

It must not be supposed that the induced current which is caused to flow through the conduit $c$ into the body of the pulp for the purposes above outlined need necessarily be atmospheric air. Any suitable gas or fluid preferably inert or non-oxidizing, such as carbon monoxid ($CO$), carbon dioxid ($CO_2$) or hydrogen ($H$), may be availed of and conducted either alone to the pulp or in conjunction with air. In Fig. 5 for example is shown diagrammatically a gas tank 20 for the storage of any of the gases aforesaid, with a valve-controlled pipe 21 entering the compartment $c$ and discharging at the slit $s$, the sulfureted hydrogen being delivered from a tank 22 to the compartment $a$ as usual. Again, in Figs. 6 and 7 is shown more or less diagrammatically a cell 1 in which the top of the compartment $c$ is closed; the pipe 23 leading from the gas tank (not shown) passing through the closed top and delivering the gas from the tank to the pulp unmixed with air. Any of these gases admitted to the pulp through the slit $s$ will maintain or restore proper working conditions within the cell the same as would atmospheric air; and accordingly I do not wish to be limited to the use of air as a complementary agent to the sulfureted hydrogen for aerating and frothing purposes. In the last modification a pipe 24 for feeding a neutralizing reagent taps the closed top of the conduit $c$, said pipe leading to any suitable source of supply (not shown). Any of the forms of apparatus shown may obviously be modified in many particulars without involving a departure from either the nature or spirit of the invention.

Having described my invention what I claim is:

1. A flotation cell provided with a stirring compartment and a froth compartment, a partition wall separating the compartments and provided with a circulating opening a suitable distance above the bottom of the compartments, there being a circulating opening adjacent said bottom, a rotary stirrer in the stirring compartment located between the openings aforesaid and operating to circulate the pulp in the stirring compartment downward from the upper opening toward the bottom opening and in the froth compartment upward from the bottom to the upper opening, a diaphragm on the side of the froth compartment spaced from the partition wall aforesaid and forming therewith an air conduit, the said conduit having a discharge adjacent to and in free communication with the upper circulating opening.

2. A flotation cell provided with a stirring compartment and a froth compartment, a partition wall separating the compartments and having a circulating opening a suitable distance above the bottom of the compartments, there being a second circulating opening adjacent said bottom, a rotary stirrer located in the stirring compartment between the openings and operating to circulate the pulp in the stirring compartment downward from the upper toward the lower opening, and in the froth compartment upward from the lower to the upper opening, a diaphragm on the side of the froth compartment spaced from the partition wall aforesaid and forming therewith an air conduit, the bottom edge of the partition extending slightly below the upper edge of the upper circulating opening and terminating opposite the opening and forming with the partition wall a discharge passage for the air which is drawn into the pulp by the inducing action of the current traversing the upper circulating opening.

3. A process of concentrating ores which consists in subjecting a charge of pulp while under agitation to the action of sulfureted hydrogen maintained in direct contact with the surface of the pulp whereby the pulp is impregnated with and aerated by the gas, and intermittently supplementing the action of the sulfureted hydrogen by suitable quantities of atmospheric air admitted to the pulp while being agitated.

4. A process of concentrating ores which consists in subjecting a charge of pulp to agitation at one point while the same is maintained in a state of comparative quiescence at another point which is in free communication with the first point, conducting to the pulp on the side of greatest agitation sulfureted hydrogen maintained against the pulp mass to cause impregnation thereof by the gas, causing a periodic influx of a complementary gaseous agent into the zone of agitation thereby forming a floatable mineral gas froth, causing said froth to migrate to the region of comparative quiet and rise to the surface of the pulp, and removing the froth from said surface.

5. A process of concentrating ores which consists in subjecting a charge of pulp of oxidized ore to agitation at one point while the same is maintained in a state of comparative quiescence at another point, conducting sulfureted hydrogen gas to the pulp mass above the point of maximum agitation and maintaining the same in contact therewith until the oxidized particles are sufficiently sulfidized and the pulp mass aerated, causing an influx of a complementary gaseous agent into the zone of agitation to assist in the proper circulation of the agitated mass and in the aeration of the pulp, thereby forming a floatable mineral froth of the sulfidized particles, causing said froth to rise to the surface of the pulp in the region of comparative quiet, and removing the froth.

6. In the concentration of ores, the process which consists in subjecting to agitation in a suitable container having two compartments in free communication at separated points, a charge of pulp, and simultaneously imparting to the agitated mass a defined circulation between the compartments, conducting sulfureted hydrogen to the pulp in the region of agitation, and causing a complementary gaseous agent to be drawn into the pulp mass by the inducing action of the circulating current.

In testimony whereof I affix my signature, in presence of two witnesses.

GEORGE B. EBERENZ.

Witnesses:
 FRED C. HILTON,
 ELLA O'HARA.